United States Patent [19]
Fujiwara et al.

[11] Patent Number: 5,038,171
[45] Date of Patent: Aug. 6, 1991

[54] MULTICOLORED IMAGE FORMING METHOD AND APPARATUS THEREFOR

[75] Inventors: Takao Fujiwara; Katsuhiko Takeda, both of Osaka, Japan

[73] Assignee: Minolta Camera Kabushiki Kaisha, Osaka, Japan

[21] Appl. No.: 291,121

[22] Filed: Dec. 28, 1988

[30] Foreign Application Priority Data

Dec. 29, 1987 [JP] Japan ................... 62-334023

[51] Int. Cl.⁵ .................................... G03L 15/01
[52] U.S. Cl. .................................... 355/208; 355/326; 355/245; 430/43; 430/45
[58] Field of Search ........ 355/218, 245, 246, 326–328, 355/208; 430/42, 43, 45; 358/75, 80

[56] References Cited

U.S. PATENT DOCUMENTS 4,655,579 4/1987 Adachi et al. .................... 355/218
4,841,336 6/1989 Kusumoto et al. ................ 355/245

FOREIGN PATENT DOCUMENTS 59-125765 7/1984 Japan ................................ 355/327

Primary Examiner—Joan H. Pendegrass
Attorney, Agent, or Firm—Burns, Doane, Swecker & Mathis

[57] ABSTRACT

An image forming method and an apparatus therefor for forming a reproduced color image on a recording medium by repeating a process of forming on a latent image carrier an electrostatic latent image corresponding to a document image through an image exposure, depositing one of at least yellow, magenta and cyan toners on the electrostatic latent image, wherein a color which is read as a mixture of magenta and cyan is deposited as magenta or cyan according to the proportion of mixing of magenta and cyan in the mixed color.

6 Claims, 11 Drawing Sheets

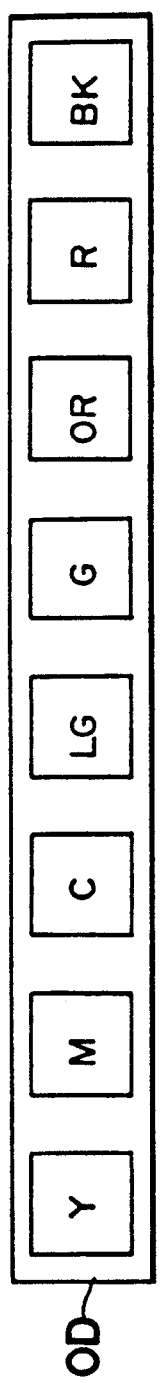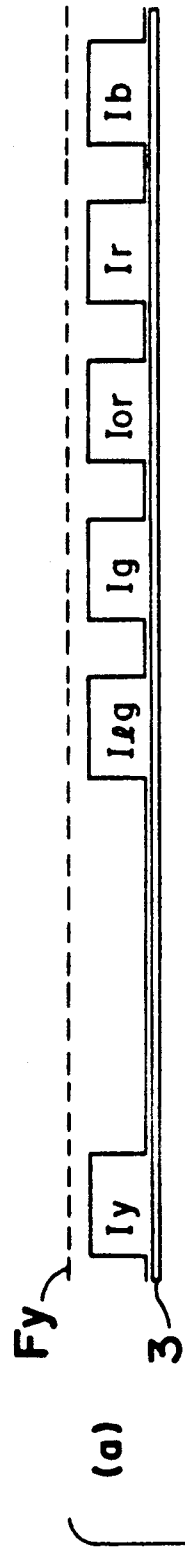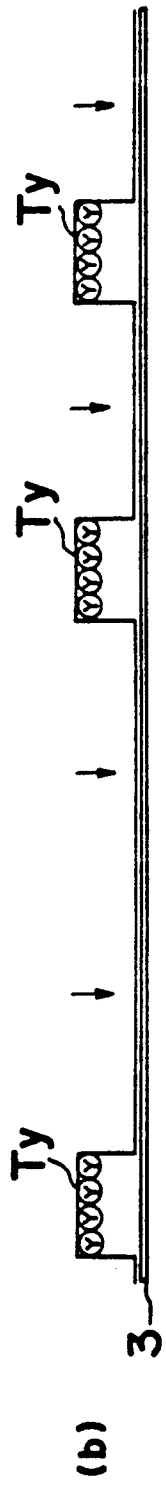
Fig. 10
Fig. 11

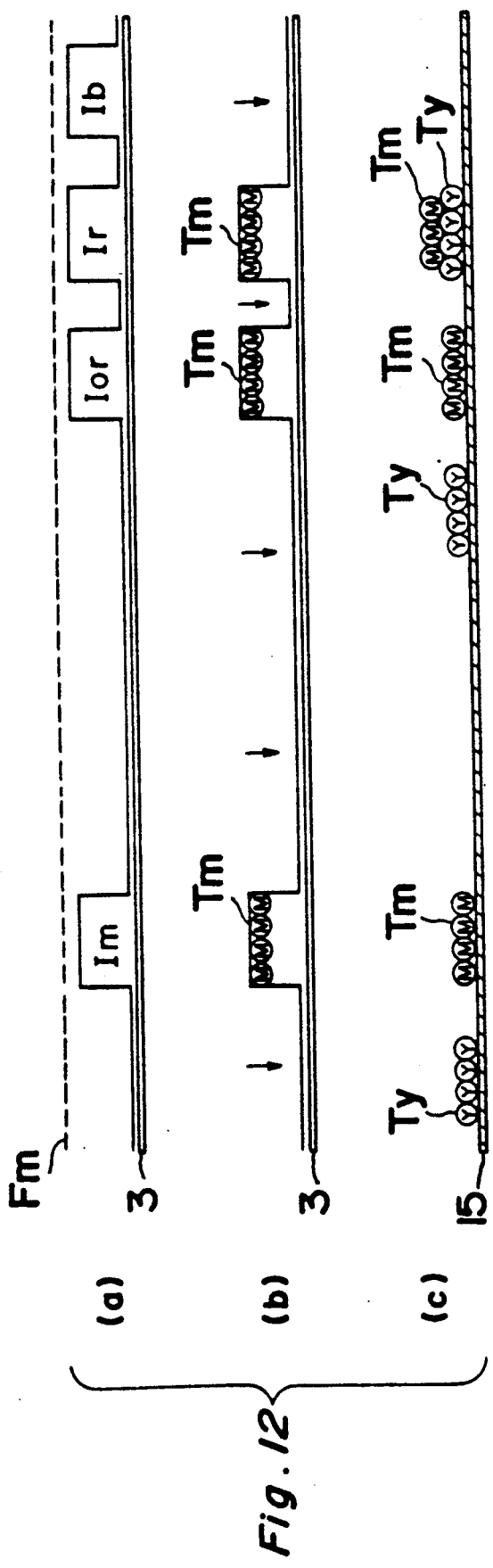
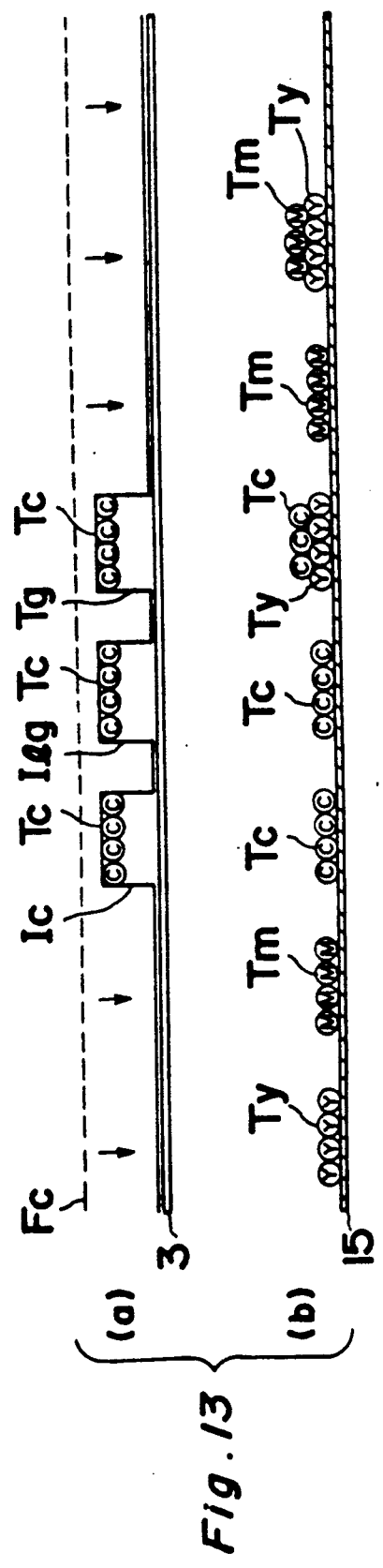
Fig. 12
Fig. 13

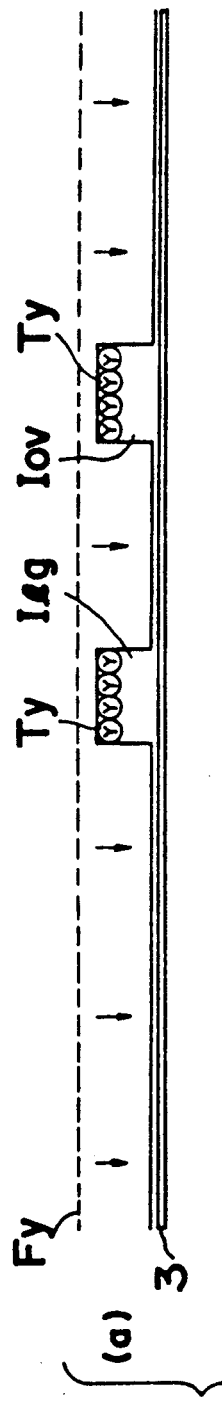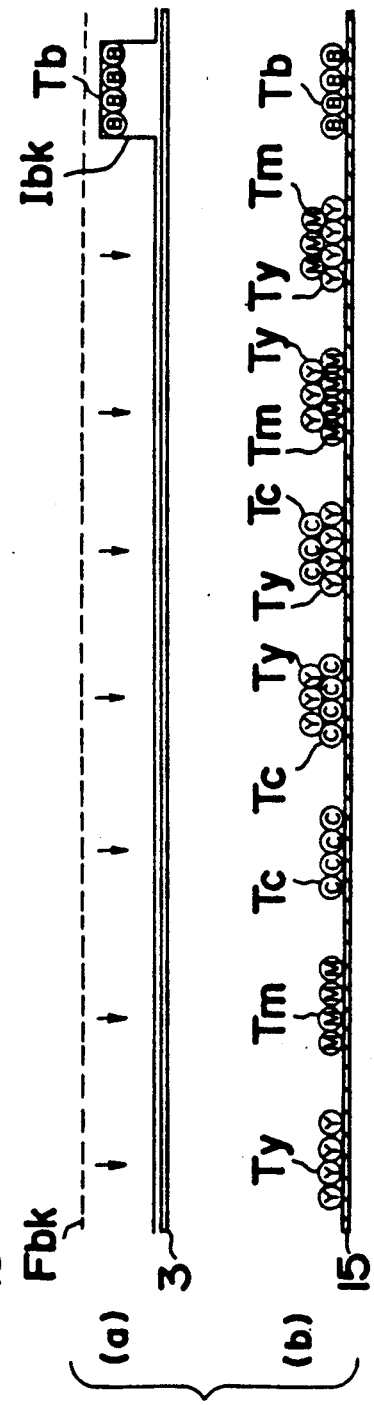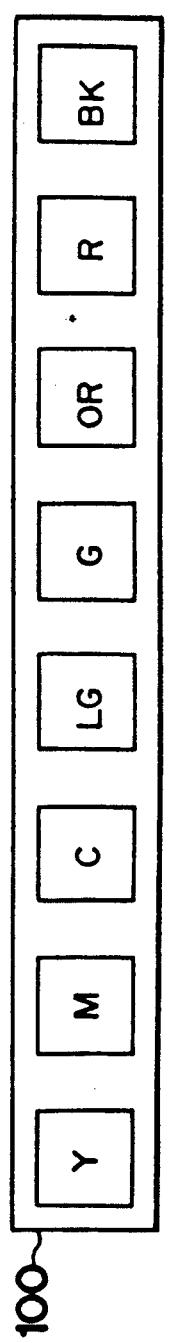

MULTICOLORED IMAGE FORMING METHOD AND APPARATUS THEREFOR

BACKGROUND OF THE INVENTION

1. Field of the Invention

The present invention generally relates to an electrophotographic process and, more particularly, to an image forming method and a device therefor designed to reproduce a multi-colored image by the use of the electrophotographic process.

2. Description of the Prior Art

With increase in number of available functions in a copying machine and also with increased applications thereof, the availability is expected of a copying machine capable of making a copy of a multi-colored image corresponding in color to the multi-colored original document. However, the copying machine currently available in the market is generally of a type capable of making copies on monochromatic basis.

Accordingly, if attempt is made to make this kind of image forming machine capable o making multi-colored copies, the machine has to be equipped with a number of developing units equal to the number of colors desired to be reproduced and, at the same time, the machine is required to have a capability of transferring and fixing a corresponding number of powder images onto one and the same copying sheet.

However, when it comes to the copying machine having a resolution of reproducing seven to eight colors, rather than two to three colors, the space in the machine occupied by the plural developing units will be considerably increased and, accordingly, not only the latent image carrier, but also the machine itself will become considerably bulky and expensive. Also, since the copying sheet is thermally affected each time it is passed through a fixing unit, the copying sheet when passed through the fixing unit several times will be curled to such an extent as to result in a displaced reproduction of the image on the copying sheet.

Also, in a multi-color development, a problem associated with color distortion tends to occur when a color reproduction is attempted with the use of two or more kinds of toner material. Although this problem will not be noticeable if combined with yellow, a combination of magenta and cyan tends to result in the noticeable color distortion.

SUMMARY OF THE INVENTION

Accordingly, the present invention is intended to provide an image forming method and an apparatus therefor wherein a minimized number of developing units are employed to form an image in a number of colors as many as possible.

Another important object of the present invention is to provide an image forming method and an apparatus therefor of the type referred to above, wherein no color distortion will occur even when a combination of magenta and cyan is employed.

According to the present invention, the above described objects can be accomplished by providing an image forming method which comprises a primary transfer step of causing a toner image on an electrostatic latent image carrier onto a transfer belt and a secondary transfer step of transferring the toner image, which has been transferred onto the transfer belt, onto a copying sheet, wherein cyan or magenta toner is transferred from the latent image carrier onto an identical area of the transfer belt in overlapping relationship and, subsequently the overlapped toner are transferred onto the copying sheet.

According to the above image forming method, for example, cyan toner is transferred onto the transfer belt so as to overlap the yellow toner which has been transferred onto the transfer belt during the execution of the primary transfer step. At this time, since the cyan toner is transferred so as to overlay the yellow toner, the transfer efficiency of the cyan toner will be lowered as compared with that of the yellow toner.

Subsequently, both of the yellow and cyan toner overlapped with each other on the transfer belt are transferred onto the copying sheet during the execution of the secondary transfer step. At this time, although almost of the cyan toner positioned uppermost on the transfer belt can be transferred onto the copying sheet, the amount of the yellow toner transferred onto the copying sheet will be smaller than that of the cyan toner because the efficiency at which the yellow toner positioned beneath the cyan toner is considerably reduced.

Accordingly, looking at the copying sheet, the cyan color is more conspicuous than the yellow color and is perceived as a green image.

On the other hand, if the sequence of transfer is reversed, that is, the transfer of the cyan toner is followed by the transfer of the yellow toner, the yellow toner will be more conspicuous than the cyan toner and will be perceived as a light green image.

Similarly, by combining the yellow toner and the magenta toner and by changing the sequence of development, the red or orange color which is a color intermediate between the yellow and the magenta ca be reproduced.

In other words, by using three colors, that is, yellow, cyan and magenta, green, light green, red and orange which are all intermediate colors can be accomplished other than those three colors.

BRIEF DESCRIPTION OF THE DRAWINGS

These and other objects and features of the present invention will become clear from the following description taken in conjunction with a preferred embodiment thereof with reference to the accompanying drawings, in which:

FIGS. 4 to 9 are flowcharts showing a multi-color image forming process, wherein FIGS. 4 to 8 illustrate first to fifth steps and FIG. 9 illustrates a monochromatic step;

FIG. 10 is a diagram showing an image on an original document;

FIGS. 11 to 15 are diagrams showing an image forming process, wherein FIGS. 11(a) to 11(c) illustrate a first step, FIGS. 12(a) to 12(c) illustrate a second step, FIGS. 13(a) and 13(b) illustrate a third step, FIGS. 14(a) and 14(b) illustrate a fourth step, and FIGS. 15(a) and 15(b) illustrate a fifth step;

FIG. 16 is a diagram showing the condition in which secondarily transferred toner adheres to a copying sheet; and FIG. 17 is a diagram showing an image formed through a process of the first to fifth steps.

DETAILED DESCRIPTION OF THE EMBODIMENT

I. Structure of Copying Machine (a) Photoreceptor Unit

Figure 1:
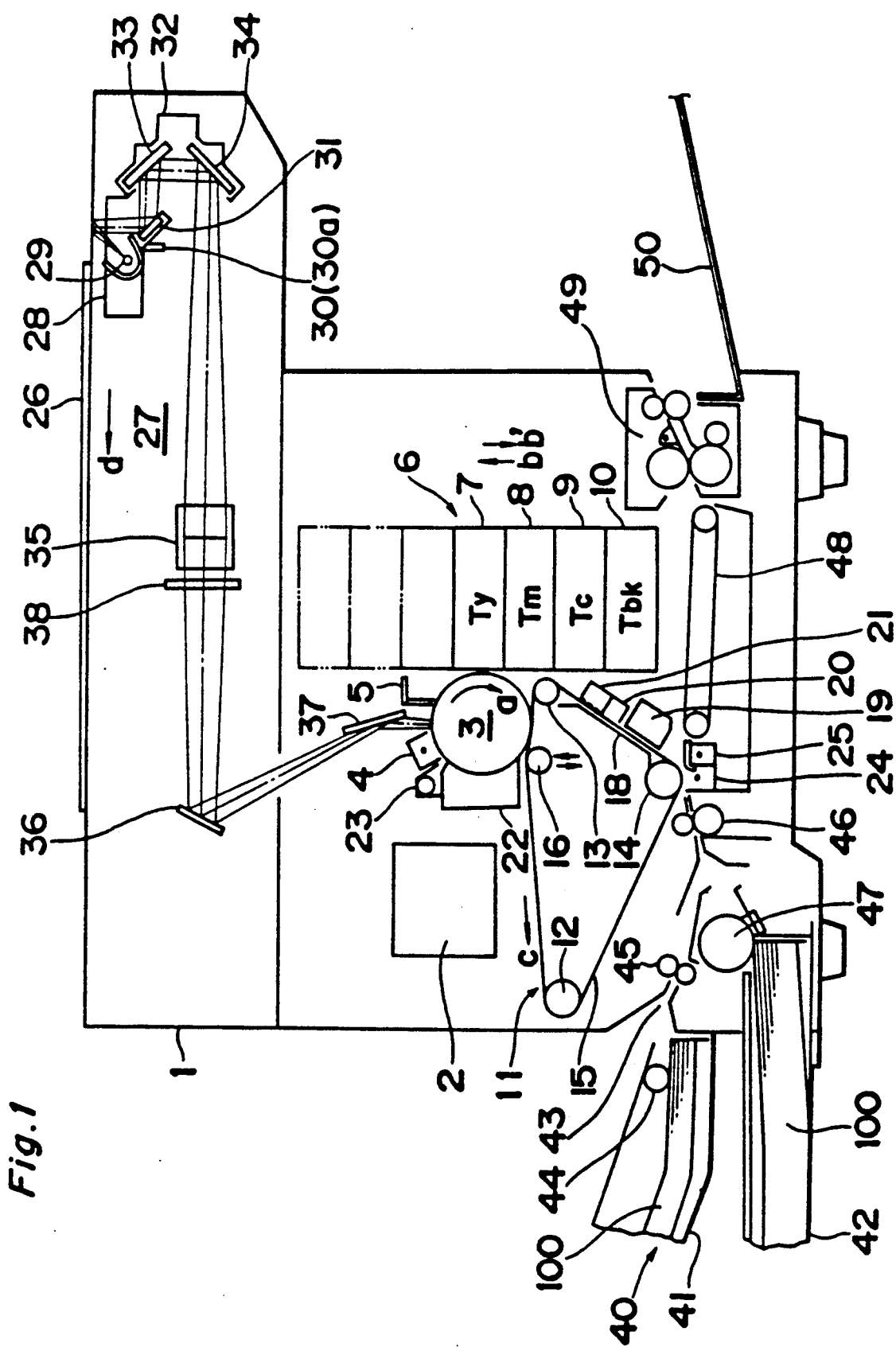
FIG. 1 is a schematic side sectional view of a copying machine.

FIG. 1 illustrates, in schematic side sectional representation, a copying machine which is used to practice a multi-color image forming method according to the present invention. As shown therein, a photoreceptor drum 3 is supported at a generally central portion of the copying machine housing 1 for rotation in one direction shown by the arrow a. In the vicinity of the outer periphery of the photoreceptor drum 3, an electrostatic charger 4, an editing eraser 5, a developing device 6, a transfer device 11, a cleaning unit 22 and a main eraser 23 are disposed so that during one complete rotation of the photoreceptor drum 3 the latter can sequentially pass from the electrostatic charger 4 towards the main eraser 23.

The editing eraser 5 comprises a plurality of light emitting elements arranged in a multi-stage fashion within a holder disposed so as to extend parallel to the axis of rotation of the photoreceptor drum 3. The editing eraser 5 is so designed that the timings at which the light emitting elements of the editing eraser 5 are selectively energized or deenergized can be controlled.

The developing device 6 comprises four developer units 7, 8, 9 and 10 and is supported for movement up and down, as shown by the arrows b and b', through a plurality of operative positions at which one of the developer units can confronts the photoreceptor drum 3 for applying a developing material (toner) onto the outer peripheral surface of the photoreceptor drum 3. So far illustrated, the developer units 7 to 10 accommodate therein respective masses of yellow toner Ty, magenta toner Tm, cyan toner Tc and black toner Tbk. It is to be noted that, although the developing device 6 has been shown and described as supported for movement up and down, the present invention may not be limited thereto, but may be applicable where toners of different colors can be selectively applied onto the outer peripheral surface of the photoreceptor drum 3.

(b) Transfer Device

The transfer device 11 includes an endless belt 15 trained around support rollers 12, 13 and 14 each extending parallel to the axis of rotation of the photoreceptor drum 3 so that the endless belt 15 can be driven in one direction shown by the arrow c and in a direction conforming to the direction of rotation of the photoreceptor drum 3. This endless belt 15 is adapted to receive and retain the toner, which has been applied onto the photoreceptor drum 3 and subsequently transferred onto such belt 15, and is provided with a dielectric body such as, for example, polyethylene, on a surface of an electroconductive substrate made of electroconductive polyester containing carbon resin or the like.

A pressing roller 16 is disposed between the support rollers 12 and 13 for movement between retracted and urging positions; said pressing roller 16 when in the urging position urging a portion of the endless belt 15 between the support rollers 12 and 13 so as to contact the photoreceptor drum 3, but said pressing roller 16 when in the retracted position allowing that portion of the endless belt 15 to be separated away from the photoreceptor drum 3.

Positioned inwardly in the vicinity of the endless belt 15 and between the support rollers 13 and 14 is a guide plate 18 cooperable with a cleaning unit 19, a charge erasing charger 20 and an electrostatic charger (SCOTRON charger) 21 all disposed on one side of a portion of the endless belt between the support rollers 13 and 14 opposite to the guide plate 18. A secondary transfer charger 24 and a separating charger 25 adjoining the secondary transfer charger 24 are positioned below the support roller 14 so as to confront the endless belt 15.

(c) Optical System

The optical system is generally identified by 27 and positioned in an upper portion of the machine housing 1. This optical system 27 includes a first slider 28 on which an illuminator lamp 29, a color detector 30 and a first reflecting mirror 31 are mounted. The first slider 28 is supported for movement immediately below and along a transparent document support 26 in a direction shown by the arrow d for scanning an original document placed on the document support 26. The color detector 30 is utilized to detect a color of the document on the document support 26 by receiving rays of light which have been emitted from the illuminator lamp 29 and subsequently reflected from the document, the structure and the function of which detector 30 will be described in detail later.

The optical system 27 also includes a second slider 32 positioned behind the first slider 28 with respect to the direction of movement of the first slider 28, said second slider 32 having second and third reflecting mirrors 33 and 34 mounted thereon. The second slider 32 is supported for movement in a direction shown by the arrow d in synchronism with the movement of the first slider 28, but at a speed half the speed of movement of the first slider 28. The optical system 27 further includes a fixedly supported fourth reflecting mirror 36, a lens assembly 35 positioned between the second slider 32 and the fourth reflecting mirror 36, a filter assembly 38 positioned between the lens assembly 35 and the fourth reflecting mirror 36, and a fifth reflecting mirror 37 positioned immediately above the photoreceptor drum 3.

(d) Filter Assembly

The filter assembly 38 comprises four filters, that is, a yellow filter Fy, a magenta filter Fm, cyan filter Fc, and a black filter Fbk, which are adapted to be selectively brought one at a time into the path of travel of the rays of light from the lens assembly 35 towards the fourth reflecting mirror 36.

Figure 2:
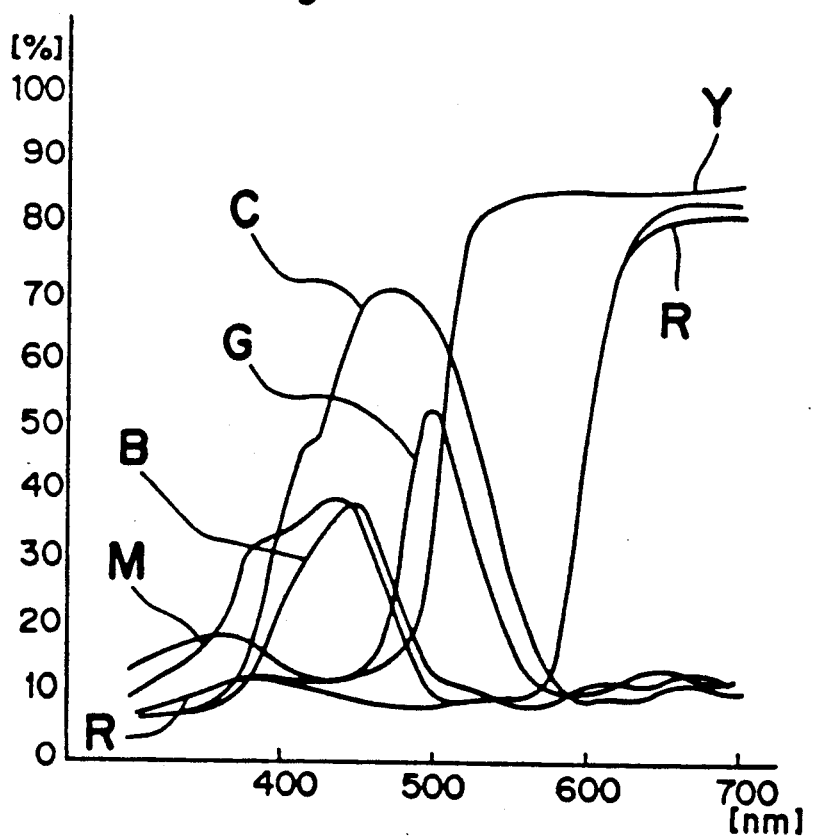
FIG. 2 is a graph illustrating spectral reflectivities of rays of light radiated to images of different colors.

The yellow filter Fy is used to absorb the light which has been radiated to a document image of a color containing a yellow component. Accordingly, as shown in the spectral reflectivity characteristic of FIG. 2, when the yellow filter Fy is brought into the path of travel of the light rays, reflected components of the light which has been radiated to images of yellow (Y), green (G) and red (R) colors can be absorbed. In other words, the amount of rays of light radiated to the images of the yellow color and other colors is lowered to a value which may be about equal to the amount of reflected component of the light which is radiated to an image of black color.

Similarly, when the magenta filter Fm is brought into the path of travel of the light rays, the amount of light radiated to images of magenta (M), orange (OR) and red (R) colors will be lowered to a value about equal to the amount of reflected component of the light which is radiated to an image of black color, and when the cyan filter Fc is brought into the path of travel of the light rays, the amount of light radiated to images of cyan (C), light green (LG) and green (G) colors will be lowered to a value about equal to the amount of reflected component of the light which is radiated to an image of black color.

The black filter Fbk is used to lower the amount of light radiated to the image of black color down to a value equal to or smaller than a predetermined amount.

(e) Sheet Supply and Transport System

Within a lower portion of the machine housing 1, a sheet supply and transport system is disposed, which comprises a sheet supply device 40 including a first supply unit 41, a second supply unit 42 and a manual feed unit 43.

Copying sheets 100 stacked in the first supply unit 41 are supplied one by one by a supply roller 44 by way of a transport roller pair 45 towards a secondary transfer station; copying sheets 100 stacked in the second supply unit 42 are supplied one by one by a supply roller 47 towards the secondary transfer station; and a copying sheet 100 manually inserted in the manual feed unit 43 is supplied by a transport roller pair 45 towards the secondary transfer station. The copying sheet so supplied from one of the units 41, 42 and 43 is supplied to the secondary transfer station, defined at a region where the transfer belt 15 confronts the secondary transfer charger 24, after the timing at which the copying sheet 100 is actually supplied to the secondary transfer station has been controlled by a timing roller 46. The copying sheet 100 which has been passed through the secondary transfer station is subsequently supplied by means of an endless transport belt 48 towards the fixing unit 49 and then discharged onto a receiving tray 50.

II. Copying Operation

A fundamental operation of the copying machine of the above described construction will now be described with reference to FIG. 1.

Assuming that a PRINT switch is switched on while the document (not shown) has been placed on the document support 26, a main drive motor 2 is powered to rotate the photoreceptor drum 3 in the direction shown by the arrow a and, substantially at the same time, the electrostatic charger 4 is operated to electrostatically charge the outer peripheral surface of the photoreceptor drum 3 to a predetermine potential.

On the other hand, in the optical system 27, the first and second sliders 28 and 32 are driven in the direction shown by the arrow d with the illuminator lamp 29 scanning the document on the document support 26. Rays of light reflected from the document are, after having been reflected by the reflecting mirrors 31, 33 and 34, subsequently passed through the lens assembly 35 and then through the filter 38, and again reflected by the reflecting mirrors 36 and 37, projected onto the photoreceptor drum 3 at an exposure station to form an electrostatic latent image on an imaging portion of the photoreceptor drum 3 in complemental relationship to the image of the document.

As the photoreceptor drum 3 being rotated in the direction shown by the arrow a passes in front of the editing eraser 5, that portion of the electrostatic charge built up on the photoreceptor drum which exteriorly surrounds the imaging area of the photoreceptor drum where the electrostatic latent image has been formed is erased by the editing eraser 5 by radiating rays of light thereto. It is to be noted that, where a multi-color image forming mode is selected as will be described later, an electrostatic charge of an image corresponding to a predetermined color is also erased by the editing eraser 5.

Subsequently, at a developing station, the electrostatic latent image on the photoreceptor drum 3 is brought into alignment with the developing device 6 at which toner material is applied from a predetermined one of the developer units over the electrostatic latent image to form a visible powder image.

On the other hand, in the transfer device 11, based on the drive of the main drive motor 2, the pressing roller 16 is moved to the urging position a shown in FIG. 1 to urge that portion of the endless transfer belt 15 between the support rollers 11 and 12 so as to lightly contact the photoreceptor drum 3 and, at the same time and during the continued movement of the endless transfer belt 15 in the direction shown by the arrow c, an electrostatic charge is applied uniformly over the endless transfer belt 15 from the electrostatic charger 21. It is to be noted that the speed of movement of the endless transfer belt 15 is equal to the peripheral velocity of the photoreceptor drum 3 and, therefore, no relative movement takes place between the endless transfer belt 15 and the photoreceptor drum 3.

While the transfer device 11 is so designed as hereinabove described, and when the visible powder image formed on the outer peripheral surface of the photoreceptor drum 3 is brought to the primary transfer station at which that portion of the endless transfer belt 15 is brought into contact with the photoreceptor drum 3, a primary transfer takes place in which the visible powder image is electrostatically transferred onto the endless transfer belt 15 on the basis of the electrostatic charge imparted by the electrostatic charger 21.

The photoreceptor drum 3 having passed through the primary transfer station is subsequently moved to a cleaning station at which residue toner and residue electrostatic charge both remaining on the photoreceptor drum 3 are successively removed by the cleaning unit 22 and the main eraser 23 in readiness for the next cycle of copying operation.

On the other hand, the toner image transferred onto the endless transfer belt 15 is conveyed together with the endless transfer belt 15 in the direction shown by the arrow c. It is to be noted that, where the multi-color image is to be formed, the copying operation as hereinabove described is repeatedly executed so that toner images formed in different colors can be transferred onto the endless transfer belt 15 in overlapped fashion with each other.

The copying sheet 100 supplied from the sheet supply device 40 is, after having been timed with the transport of the toner image, passed through the timing roller 46 onto the secondary transfer station at which, based on the discharge effected by the secondary transfer charger 24, a secondary transfer takes place with the toner image consequently transferred onto the copying sheet 200.

The copying sheet 100 onto which the toner image has been transferred at the secondary transfer station is subsequently separated from the endless transfer belt 15 by the separating charger 25 and relayed onto the endless transport belt 48 by which the copying paper 100 is conveyed to the fixing unit 49. After the toner image on the copying sheet 100 has been permanently fixed by the fixing device 49, the copying sheet 100 bearing the fixed toner image is discharged onto the receiving tray 50.

It is to be noted that residue toner and residue electrostatic charge both remaining on the endless transfer belt 15 subsequent to the transfer of the toner image onto the copying sheet 100 at the secondary transfer station are successively removed by the cleaning unit 19 and the charge removing charger 20 in readiness for the next cycle of transfer operation.

III. Color Discriminating Process and Others

Hereinafter, a color discriminating process will be described.

A color discriminating device 30 comprises a plurality of photoelectric elements (hereinafter referred to as "CCD sensor") 30a arranged continuously in a direction parallel to the axis of rotation of the photoreceptor drum 3, each of said photoelectric elements 30a having a width within the range of 1.5 to 2 mm. The CCD sensor 30a is provided with three photo-diodes LDr, LDg and LDb for detecting three primary color components R, G and B included in reflected component of the rays of light which have been radiated to an object, and the color of a non-illuminated object can be discriminated on the basis of respective outputs from the photo-diodes LDr, LDg and LDb.

It is to be noted that the photo-diodes LDr, LDg and LDb are preadjusted to as to give equal outputs by radiating light to objects of the three primary colors, that is, red (R), green (G) and blue (B).

Figure 3:
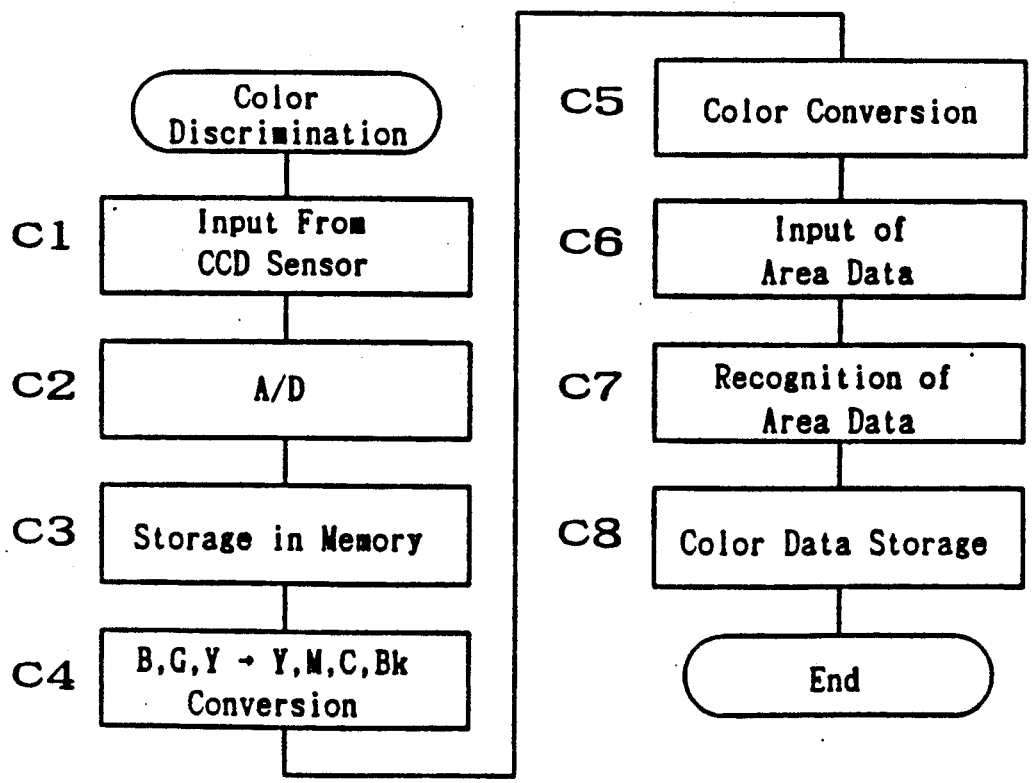
FIG. 3 is a flowchart showing a process of color discrimination.
Figure 4:
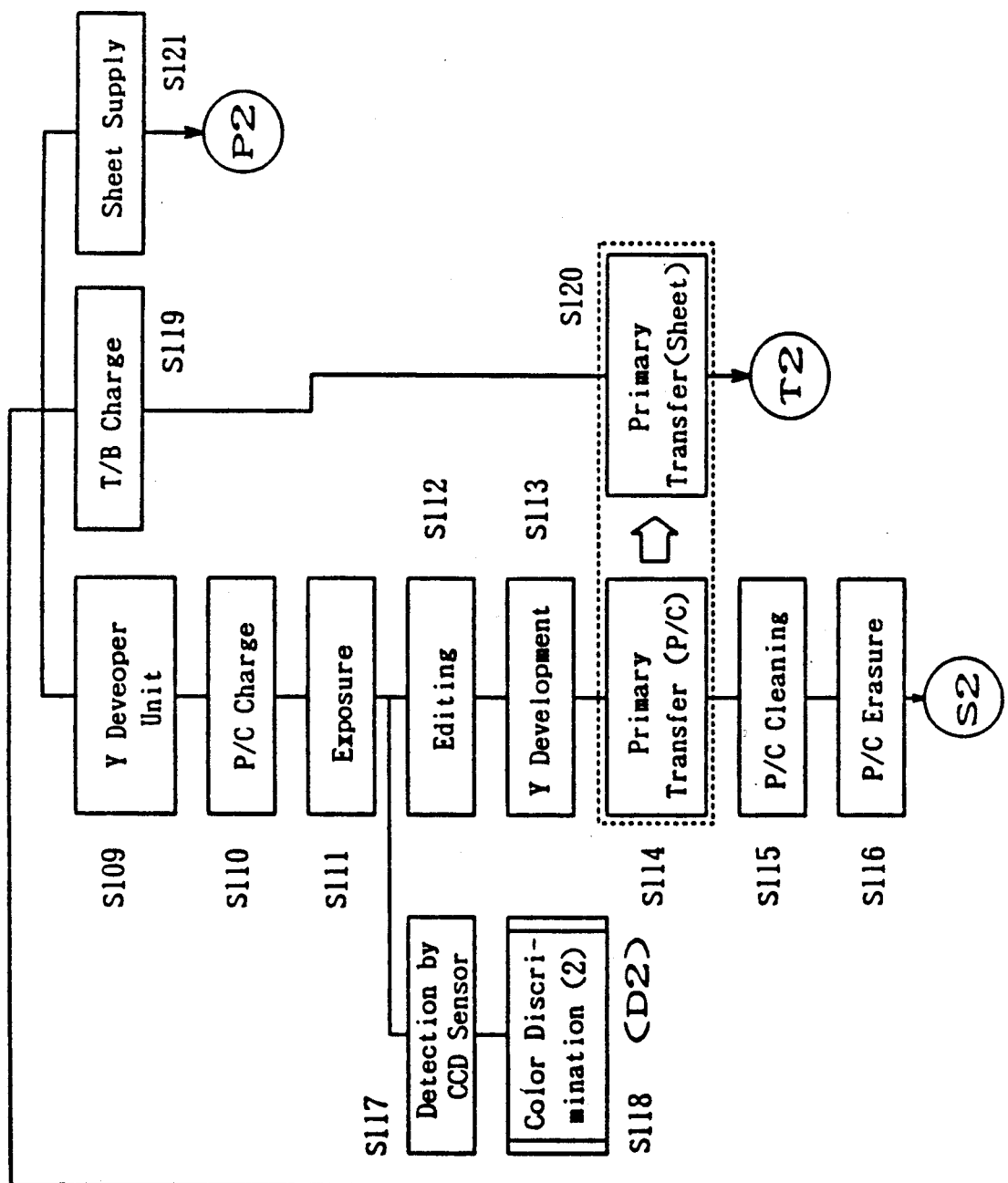

The operation associated with the color discrimination is carried out according to a flowchart shown in FIG. 3.

Referring now to FIG. 3, when the copying operation described hereinbefore is initiated followed by the drive of the optical system 27, and at step C1, the CCD sensor 30a detects rays of light reflected from the document placed on the document support 26 and respective output signals from the photo-diodes LDr, LDg and LDb are inputted as analog signals. In other words, the color of each of minute areas delimited by finely dividing the document in two directions perpendicular to each other can be detected as divided into red (R), green (G) and blue (B) color elements.

Subsequently, the analog signals referred to above are converted into digital signals fr, fg and fb at step C2, followed by the storage of those digital signals fr, fg and fb in a memory A at step C3.

At steps C4 and C5, based on the digital signals fr, fg and fb stored in the memory A, discrimination coefficient kr', kg' and kb' representative of respective weights of the red (R), green (G) and blue (B) colors of an image in each of the minute areas referred to above are calculated according to the following equations.

$$kr' = fr/(fr + fg + fb)$$

$$kg' = fg/(fr + fg + fb)$$

$$kb' = fb/(fr + fg + fb)$$

Also, by comparing a first reference value $\alpha$ with a second reference value $\beta$ which is greater than the first reference value $\alpha$ with respect to each of the color discrimination coefficients kr', kg' and kb' color conversion is carried out in the following manner to determine color discrimination data D (kr, kg, kb).

When $\alpha \leq$ (kr', kg', kb'); kr, kg, kb = 2
When $\beta >$ (kr', kg', kb'); kr, kg, kb = 0
When $\beta \leq$ (kr', kg', kb') $< \alpha$; kr, kg, kb = 1

Then, based on a combination of those color discrimination data D (kr, kg, kb), the color, that is, the reproduced color, of each of the minute areas is determined in reference to the following Table 1 in such a way that, if the data represents (2, 2, 0) or (2, 0, 2), it means yellow (Y) or magenta (M), respectively. It is to be noted that in Table 1 the color of toner for accomplish the reproduction of each color and the sequence of development thereof are also illustrated.

TABLE 1

| kr, | kg, | kb | Reproduced Color | Toner Used and Developing Sequence | | | | | |
|---|---|---|---|---|---|---|---|---|---|
| | | | | Y | M | C | Y | M | BK |
| 2 | 2 | 0 | Yellow (Y) | ○ | — | — | — | — | — |
| 2 | 0 | 2 | Magenta (M) | — | ○ | — | — | — | — |
| 0 | 2 | 2 | Cyan (C) | — | — | ○ | — | — | — |
| 1 | 2 | 0 | Light Green (LG) | — | — | ○ | ○ | — | — |
| 0 | 2 | 0 | Green (G) | ○ | — | ○ | — | — | — |
| 2 | 1 | 0 | Orange (OR) | — | ○ | — | ○ | — | — |
| 2 | 0 | 0 | Red (R) | ○ | ○ | — | — | — | — |
| 1 | 0 | 2 | Violet (V) | — | ○ | ○ | — | — | — |
| 0 | 0 | 2 | Blue (B) | — | — | ○ | — | ○ | — |
| 2 | 2 | 2 | Black or Gray (BK) | — | — | — | — | — | ○ |

Then, at step C6, where an image editing such as, for example, a masking in which a portion of the image is removed by an editor or a trimming in which a portion of the image is removed is specified, an input of a data associated with an area to be edited is accepted, followed by step C7 at which the position of the document corresponding to the area to be edited is recognized so that color recognition data corresponding thereto can be rewritten into a predetermined value. Finally, at step C8, the color discrimination data is stored.

IV. Multi-color Image Forming Method

The operation of the copying machine when the latter is set in a multi-color image forming mode will now be described, first briefly and then in details.

BRIEF DESCRIPTION OF THE OPERATION

In the case where the copying machine referred to above is used to reproduce an image of eight colors, that is, yellow (Y), magenta (M), cyan (C), light green (LG), green (G), orange (OR), red (R) and black (Bk), first to fifth steps tabulated in Table 2 are sequentially executed.

It is to be noted that the violet (V) and blue (B) are recognized as magenta (M) and cyan (C), respectively, and a compromise has been made that no mixed color of magenta (M) and cyan (C) will not be reproduced.

TABLE 2

| Steps | Developing Toner | Image Colors | | | | | | | |
|---|---|---|---|---|---|---|---|---|---|
| | | Y | M | C | LG | G | OR | R | BK |
| 1 | Y | ○ | — | — | — | ○ | — | ○ | — |
| 2 | M | — | ○ | — | — | — | ○ | ○ | — |
| 3 | C | — | — | ○ | ○ | ○ | — | — | — |
| 4 | Y | — | — | — | ○ | — | — | — | — |
| 5 | BK | — | — | — | — | — | — | — | ○ |

(a) During the first step, electrostatic latent images corresponding to images of yellow (Y), green (G) and red (R) are formed on the outer peripheral surface of the photoreceptor drum 3, which latent images are subsequently developed by the yellow toner Ty, the resultant yellow toner images being subsequently primarily transferred onto the endless transfer belt 15.

(b) During the second step, electrostatic latent images corresponding to images of magenta (M), orange (OR) and red (R) are formed on the outer peripheral surface of the photoreceptor drum 3, which latent images are subsequently developed by the magenta toner Tm, the resultant magenta toner images being subsequently primarily transferred onto the endless transfer belt 15 so as to overlay the yellow toner images which have been transferred onto the same transfer belt 15 during the first step. At this time, magenta toner Tm (indicated by in Table 2) corresponding to the image of red (R) is transferred so as to overlay the yellow toner Ty which has been primarily transferred during the first step in correspondence with the image of red (R). However, the magenta toner Tm which is transferred so a to overlay the yellow toner Ty exhibits a lower transfer efficiency than that exhibited when transferred onto the transfer belt which does not bear any toner and, therefore, the amount of adherence of the magenta toner Tm is small.

(c) During the third step, electrostatic latent images corresponding to images of cyan (C), light green (LG) and green (G) are formed on the outer peripheral surface of the photoreceptor drum 3, which latent images are subsequently developed by the cyan toner Tc, the resultant cyan toner images being subsequently primarily transferred onto the endless transfer belt 15. At this time, in an image area of green (G), the cyan toner Tc (indicated by in Table 2) is transferred over the yellow toner Ty which has been transferred during the first step. And, the amount of adherence thereof is small.

(d) During the fourth step, electrostatic latent images corresponding to images of light green (LG) and orange (OR) are formed on the outer peripheral surface of the photoreceptor drum 3, which latent images are subsequently developed by the yellow toner Ty, the resultant yellow toner images being subsequently primarily transferred onto the endless transfer belt 15. At this time, those toners (indicated by in Table 2) are transferred so as to overlay the cyan toner Tc and the magenta toner Tm which have been transferred respectively during the third and second steps. And, the amount of adherence thereof is small.

(e) During the final fifth step, an electrostatic latent images corresponding to an image of black (BK) is formed on the outer peripheral surface of the photoreceptor drum 3, which latent image is subsequently developed by the black toner Tbk, the resultant black toner image being subsequently primarily transferred onto the endless transfer belt 15.

(f) All of the toners transferred onto the transfer belt 15 in the manner as hereinabove described are transferred onto the copying sheet 100 one at a time.

It is to be noted that the overlapping toners transferred onto the endless transfer belt 15 are, when transferred onto the copying sheet 100, reversed in position relative to each other. In other words, in the area corresponding to the image of green (G), the yellow toner Ty and the cyan toner Tc assume the innermost and outermost positions on the endless transfer belt 15, respectively, however, the yellow toner Ty and the cyan toner Tc assume the outermost and innermost positions when transferred from the endless transfer belt 15 onto the copying sheet 100.

As for the green image referred to above, almost of all the cyan toner Tc assuming the outermost position on the transfer belt 15 are transferred onto the copying sheet 100. However, the transfer efficiency of the yellow toner Ty assuming the innermost position on the transfer belt 15 is considerably lowered and, therefore, the amount of toner transferred onto the copying sheet 100 becomes smaller than that of the cyan toner.

As a result thereof, at the portion which has been secondarily transferred, the cyan (C) is conspicuous and can be perceived as green (G).

Conversely, at the area of light green (LG), the yellow (Y) is more conspicuous than the cyan (C) and can be perceived as light green.

A similar description can apply even in the case of the area of each of red (R) and orange (OR) and, therefore, the color of the document can be recognized.

DETAILED DESCRIPTION OF THE OPERATION

Hereinafter, the multi-color image forming operation will be described with particular reference to FIGS. 4 to 9 and also to FIGS. 10 to 17. It is to be noted that the process diagrams of FIGS. 11 to 16 are illustrative of the process required to reproduce the colors of the document OD having eight-color images of yellow (Y), magenta (M), cyan (C), light green (LG), green (G), orange OR , red (R) and black (Bk).

(i) First step: Sl (See FIG. 4)

When the copying machine is powered and the program starts consequently, the copying machine is initialized at step S101 and the number of copies desired to make is set to "1". At subsequent step S102, inputs from selected one or ones of various keys such as tens keys provided on an operating panel formed atop the machine housing 1 are accepted.

When a PRINT switch is switched on, the first slider 28, with the illuminator lamp 29 lit, undergoes a pre-scanning movement in the direction shown by the arrow d to effect a preliminary exposure at step S103. Rays of light emitted from the illuminator lamp 29 and reflected from the document are detected by the CCD sensor 30a at step S104. Then, based on detection values of the CCD sensor 30a, the previously described color discriminating process (1) is executed and the color of each of the minute areas delimited by dividing the document in the two directions perpendicular to each other is recognized, the data D1 of the color so discriminated being subsequently stored in a memory (steps S104 and S105).

Thereafter, at step S106, a decision is made on the basis of the discriminated color data D1 to determine if the document contains image areas of yellow (Y), green (G) and red (R). If the result of the decision at step S106 indicates "No", the second step S2 takes place, but if it indicates "Yes", that is, if the document contains at least one of the image areas of yellow {Y), green (G) and red (R), another decision is made at step S107 to determine if the document contain only a monochromatic (single-color) image of yellow (Y). Should the result of decision at step S107 indicate that the document contains the monochromatic image of yellow (Y), the monochromatic step SO takes place, but should it indicate "No", step S108 takes place at which the yellow filter Fy is set as the filter assembly 30 of the optical system 27.

It is to be noted that, at step S106, when the copying operation starts, a process is executed with the use of the discriminated color data D1, but when in a multi-copy mode, the process is executed with the use of discriminated color data which have been calculated during the execution of the other steps as will be described later.

When the foregoing operation terminates, the yellow developer unit 7 of the developing device 6 is set in position ready to perform the development at step S109, followed by step S110 at which the outer peripheral surface of the photoreceptor drum 3 is electrostatically charged to a predetermined potential. Thereafter, and at step S111, the slider 28 moves with the illuminator lamp 28 lit so that rays of light radiated to the document and reflected therefrom can be projected onto the photoreceptor drum 3 through the yellow filter Fy thereby to form an electrostatic latent image.

At this time, of the rays of light reflected from the document, a light component radiated to an image colored in a yellow component is absorbed by the yellow filter Fy.

Accordingly, as shown in FIG. 11(a), the rays of light radiated to respective images of yellow (Y), green (G) and red (R) are not exposed on the photoreceptor drum, and respective potentials of portions corresponding to respective images of yellow (Y), green (G), red (R), light green (LG) and orange (OR) remains at respective values equal to the potential built up at the time of charging and, therefore, electrostatic latent images Iy, Ig, Ir, Ilg and Ior such as shown in FIG. 11(a) are formed on the photoreceptor drum 3. At the same time, the amount of light reflected from an image of black (Bk) color is small and the potential of a portion corresponding thereto remains at a value equal to the potential built up at the time of charging and, therefore, an electrostatic latent image Ibk is also formed on the photoreceptor drum 3.

Also, during the exposure the CCD sensor 30a detects the reflected rays of light and, on the basis of the output from the CCD sensor 30a, a color discriminating process (2) is executed at step S117 to provide a discriminated color data D2 of each area which is subsequently stored in a memory at step S118. The results thereof are utilized in the practice of the second step S2.

Also, around the photoreceptor drum, based on the discriminated color data D1 or discriminated color data provided by a color discriminating process executed immediately therebefore, the light emitting elements of the editing erase 5 are individually controlled to be switched on and off to leave only the electrostatic latent images Iy, Ig and Ir, but to render the potentials of the other areas to be lowered down to about zero volt at step S112. In this way, the potential of that portion of the electrostatic latent image Ibk corresponding to the image of black (Bk) is also lowered down to about zero volt.

It is to be noted that, although the color discriminating process (2) and the editing erasure take place substantially at the same time, the discriminated color data D1 stored in the memory are outputted to the editing eraser 5 before the discriminated color data D2 resulting from the color discriminating process (2) are stored, and therefore, the editing eraser 5 will not operate on the basis of the discriminated color data D2.

Thereafter, at step S113, the electrostatic latent images Iy, Ig and Ir are supplied with the yellow toner at the developing station from the yellow developer unit 7 to render them to form the yellow toner images as shown in FIG. 11(b).

On the other hand, in the transfer device 11, the surface of the endless transfer belt 15 is charged by the electrostatic charger 21 to a predetermined potential at step S119 while that portion of the transfer belt 15 between the support rollers 11 and 12 are brought into contact with the outer peripheral surface of the photoreceptor drum 3 so that, as shown in FIG. 11(c), the yellow toner (Ty) images can be primarily transferred onto the transfer belt 15 at steps S114 and S120), followed by the second step T2.

The residue toner and the residue electrostatic charge remaining on the outer peripheral surface of the photoreceptor drum 3 are successively removed at steps S115 and S116, followed by the step S2.

On the other hand, at the sheet supply and transport system, on the basis of respective rotations of the sheet supply roller 44 and/or the transport roller 45, the copying sheet 100 is transported to a position preceding the timing roller 46 at step S121, followed by the second step P2.

(ii) Second Step: S2 See FIG. 5)

This second step S2 is a process which takes place upon the termination of the first step S1 or in the event that, as a result of the decision at step S106 during the execution of the first step S1, no one of the images of yellow Y), green (G) and red R colors is found in the document.

Figure 5:
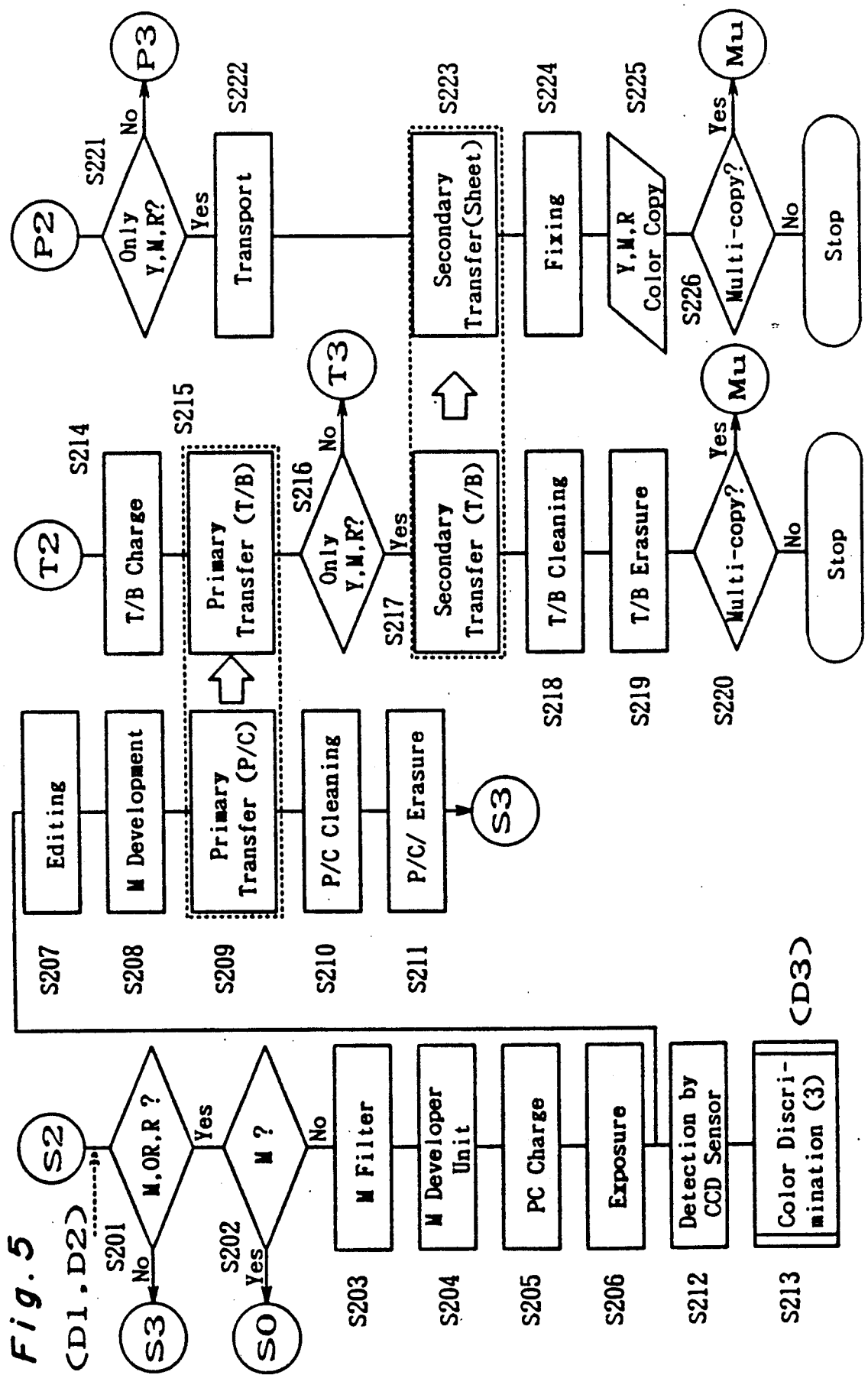

Referring now to FIG. 5, at step S201, on the basis of the discriminated color data D2 provided as a result of the color discriminating process (2) or the discriminated color data resulting from the color discriminating process executed immediately therebefore, a decision is made to determine if images of the document contain any one of the magenta (M), orange (OR) and red (R) colors. Should the result of the decision at step S201 indicate "Yes", the next succeeding decision step S202 is executed, but should it indicates "No", the program skips onto the third step S3.

During the decision step at S202, a decision is made to determine if the document contains only a monochromatic image of magenta (M). If a result of this decision indicates "Yes", the monochromatic step SO takes place, but if it indicates "No", the magenta filter Fm is set in the path of travel of the reflected light rays at step S203.

Around the photoreceptor drum 3, the magenta developer unit 8 of the developing device 6 is set in position ready to perform the development at step S204, followed by step S205 at which the outer peripheral surface of the photoreceptor drum 3 is electrostatically charged to a predetermined potential. Thereafter, and at step S206, the optical system 27 is driven to effect the exposure of the image of the document at step S206 thereby to form the electrostatic latent images Im, Ior, Ir and Ibk on the photoreceptor drum 3 as shown in FIG. 12(a). Also, during the exposure the CCD sensor 30a detects the reflected rays of light at step S212 and, on the basis of the output from the CCD sensor 30a, a color discriminating process (3) is executed at step S213 to provide discriminated color data D3 of each area which is subsequently stored in a memory.

Thereafter, rays of light are radiated from the editing eraser 5 onto the photoreceptor drum 3 thereby to leave only the electrostatic latent images Im, Ior and Ir corresponding respectively to the magenta (M), orange (OR) and red (R) images, but to render the potentials of the other areas to be lowered down to about zero volt at step S207.

Accordingly, during the subsequent developing operation, the magenta toner Tm is supplied only to the electrostatic latent images Im, Ior and Ir at step S208 as shown in FIG. 12(b).

The magenta toner Tm so supplied onto the electrostatic latent images are primarily transferred at steps S209 and S215 onto the endless transfer belt 15 which has been charged at step S214 by the electrostatic charger 21 and onto which the yellow toner Ty has been transferred as a result of the execution of the first step S1. In particular, at the time of the transfer onto the endless transfer belt 15, in the red (R) area, the magenta toner Tm is overlaid on the yellow toner Ty.

In order to avoid any displacement between the toner image formed with the yellow toner Ty and the toner image formed with the magenta toner Tm, the timing at which the optical system 27 is operated and the timing at which both of the photoreceptor drum 3 and the transfer belt 15 are driven are so adjusted as to avoid such displacement. This adjustment is electrically precisely accomplished.

It is to be noted that, in the transfer belt 15 which has undergone the first step S1, even though the electrostatic charger 21 is stably operated, that area of the transfer belt 15 where the yellow toner Ty has been transferred cannot be electrostatically charged so satisfactorily as the remaining area of the transfer belt 15 where no toner is transferred. Because of this, in the area where the yellow toner Ty has been transferred, a satisfactory potential difference cannot be attained relative to the photoreceptor drum 3 so much as that between the photoreceptor drum 3 and the other areas of the transfer belt 15 and, therefore, the toner transfer efficiency tends to be lowered. Accordingly, in the image area of red (R), the number of toner particles of the magenta toner Tm applied over the yellow toner Ty per unit surface area becomes smaller than that of the yellow toner Ty. See FIG. 12(b).

When and after the primary transfer completes in the manner as hereinabove described, the residue toner and the residue electrostatic charge remaining on the outer peripheral surface of the photoreceptor drum 3 are successively removed at steps S210 and S211, followed by the third step S3.

On the other hand, at both of the transfer device 11 and the sheet supply and transport system, on the basis of the discriminated color data D1 or the discriminated color data resulting from the color discriminating process executed immediately therebefore, a decision is made to determine if the image of the document is colored only in yellow (Y), magenta (M) and red (R). If the result of decision at step S216 indicates that the document contains colors other than yellow (Y), magenta (M) and red (R), the respective third steps T3 and P3 take place (Steps S216 and S221).

Also, where the image in the document is colored only in yellow (Y), magenta (M) and red (R), the copying sheet 100 is, after having been synchronized with the transport of the toner images on the transfer belt 15, transported by the timing roller 46 onto the secondary transfer station where the secondary transfer charger 24 is installed at step S222, and the toner images on the transfer belt 15 are subsequently secondarily transferred onto the copying sheet 100 at step S217 and S222.

Then, in the transfer device 11, the residue toner and the residue electrostatic charge on the transfer belt 15 are removed successively at steps S218 and S219, followed by Mu if the machine is in a multi-copy mode, or followed by the interruption of the operation at step S220 if the machine is in a single copy mode. On the other hand, in the sheet supply and transport system, the copying sheet 100 is supplied onto the transfer device 49 and, after the toner images referred to above have been transferred onto the copying sheet 100, the copying sheet 10 bearing the images formed with the use of yellow (Y), magenta (M) and red (R) toners is discharged onto the receiving tray 50 at step S225. However, if the copying machine is set in the multicopy mode as determined at a decision step S226, Mu takes place, but if it is set in the single copy mode, the copying machine is brought to a halt.

(iii) Third Step: S3 (See FIG. 6)

This third step S3 is a process which takes place upon the termination of the second step S2 or depending on the result of decision performed at step S201 during the execution of the second step S2, and the flow of the third step S3 is substantially identical with that of the second step S2 except for the difference in contents to be determined.

Figure 6:
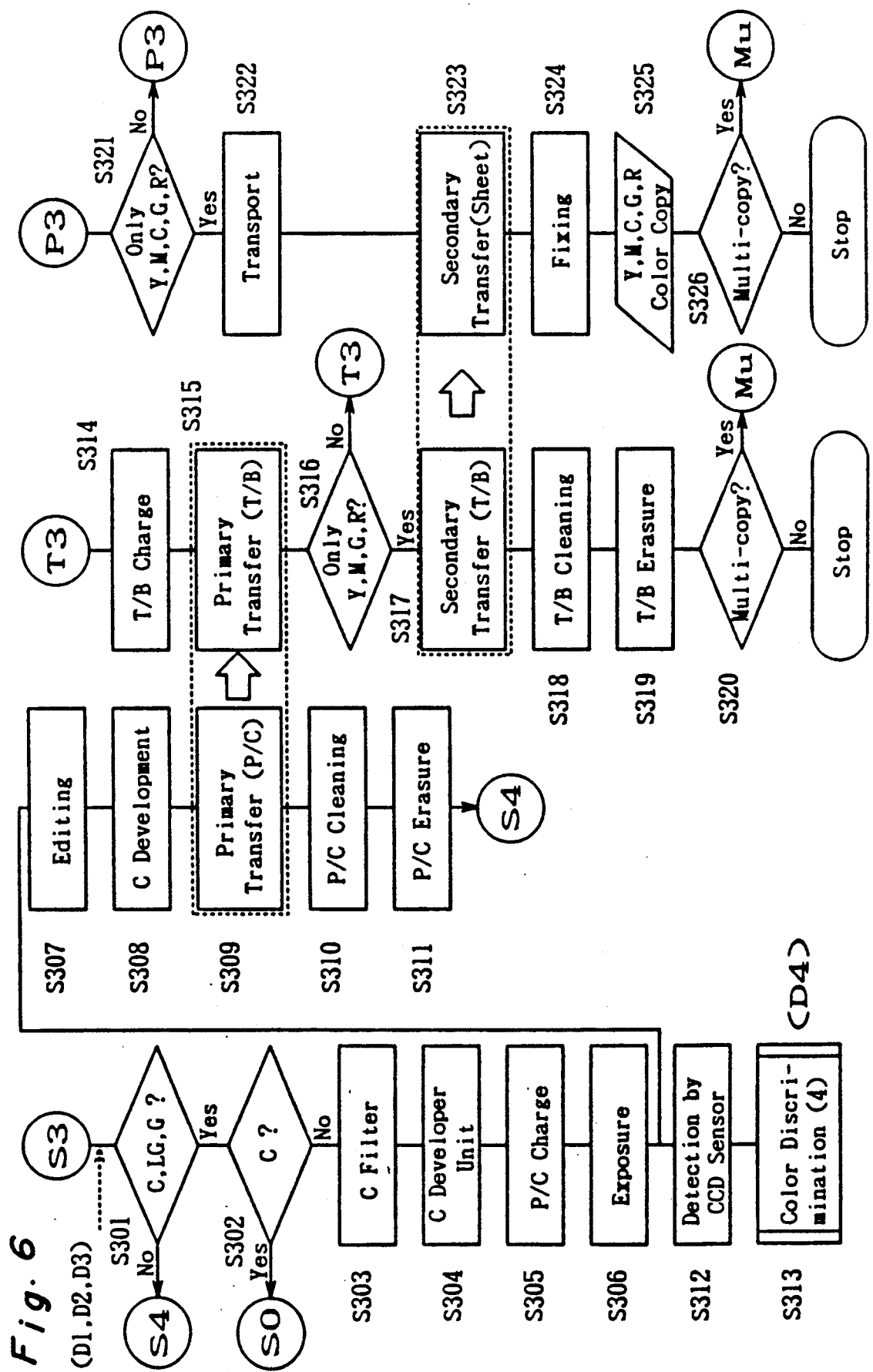

Referring now to FIG. 6, at step S301, on the basis of the discriminated color data resulting from the color discriminating process executed immediately therebefore, a decision is made to determine if images of the document contain any one of the cyan (C), light green (LG) and green (G). Should the result of the decision at step S301 indicate "Yes", the next succeeding decision step S302 is executed, but should it indicates "No", the program skips onto the fourth step S4.

During the decision step at S302, a decision is made to determine if the document contains only a monochromatic image of cyan (C). If a result of this decision indicates "Yes", the monochromatic step S0 takes place, but if it indicates "No", the cyan filter Fc is set in the path of travel of the reflected light rays at step S303.

Around the photoreceptor drum 3, the cyan developer unit 9 of the developing device 6 is set in position ready to perform the development at step S304, followed by step S305 at which the outer peripheral surface of the photoreceptor drum 3 is electrostatically charged to a predetermined potential. Thereafter, and at step S306, the optical system 27 is driven to effect the exposure of the image of the document at step S306 thereby to form the electrostatic latent images Ic, Ilg, Ig and Ibk on the photoreceptor drum 3. Also, during the exposure the CCD sensor 30a detects the reflected rays of light at step S312 and, on the basis of the output from the CCD sensor 30a, a color discriminating process (4) is executed at step S313 to provide discriminated color data D4 of each are which is subsequently stored in a memory.

Thereafter, rays of light are radiated from the editing eraser 5 onto the photoreceptor drum 3 thereby to leave only the electrostatic latent images Ic, Ilg and Ig corresponding respectively to the cyan (C), light green (LG) and green (G) images, but to render the potentials of the other areas to be lowered down to about zero volt at step S307 as shown in FIG. 13(a). Accordingly, during the subsequent developing operation, the cyan toner Tc is supplied only to the electrostatic latent images Ic, Ilg and Ig at step S308 as shown in FIG. 13(b). The cyan toner Tc so supplied onto the electrostatic latent images are primarily transferred at steps S309 and S315 onto the endless transfer belt 15 which has been charged at step S314 by the electrostatic charger 21 and onto which the yellow toner Ty has been transferred as a result of the execution of the first step S1. In particular, at the time of the transfer onto the endless transfer belt 15, in the portion corresponding to the green (G) image, the cyan toner Tc is overlaid on the yellow toner Ty, however, the mount of transfer thereof is smaller than that of the yellow toner Ty. (See FIG. 13(b)).

When and after the primary transfer completes in the manner as hereinabove described, the residue toner and the residue electrostatic charge remaining on the outer peripheral surface of the photoreceptor drum 3 are successively removed at steps S310 and S311, followed by the fourth step S4.

On the other hand, at both of the transfer device 11 and the sheet supply and transport system, on the basis of the discriminated color data D3, a decision is made to determine if the image of the document is colored only in cyan (C), light green (LG) and green {G}. If the result of decision indicates that the document contains colors other than cyan (C), light green (LG) and green (G), the fourth steps T3 and P3 take place (Steps S316 and S321).

Also, where the image in the document is colored only in yellow (Y), magenta (M), cyan (C), green (G) and red (R), the toner images on the transfer belt 15 are subsequently secondarily transferred onto the copying sheet 100 at steps S317 and S322.

Then, in the transfer device 11, the residue toner and the residue electrostatic charge on the transfer belt 15 are removed successively at steps S318 and S319, followed by Mu if the machine is in the multi-copy mode, or followed by the interruption of the operation at step S320 if the machine is in the single copy mode.

On the other hand, in the sheet supply and transport system, the copying sheet 100 is supplied onto the transfer device 49 and, after the toner images referred to above have been transferred onto the copying sheet 100, the copying sheet 10 bearing the images formed with the use of yellow (Y), magenta (M), cyan (C) green (G) and red (R) toners is discharged onto the receiving tray 50 at step S325. However, if the copying machine is set in the multicopy mode, Mu takes place, but if it is set in the single copy mode, the copying machine is brought to a halt (steps S324 to S326).

(iv) Fourth Step: S4 (See FIG. 7)

The fourth step S4 is a process which takes place upon the termination of the third step S3 or which follows from step S301 during the execution of the third step S3, and contents to be processed during this fourth step S4 are substantially identical with those during any one of the second and third steps.

Figure 7:
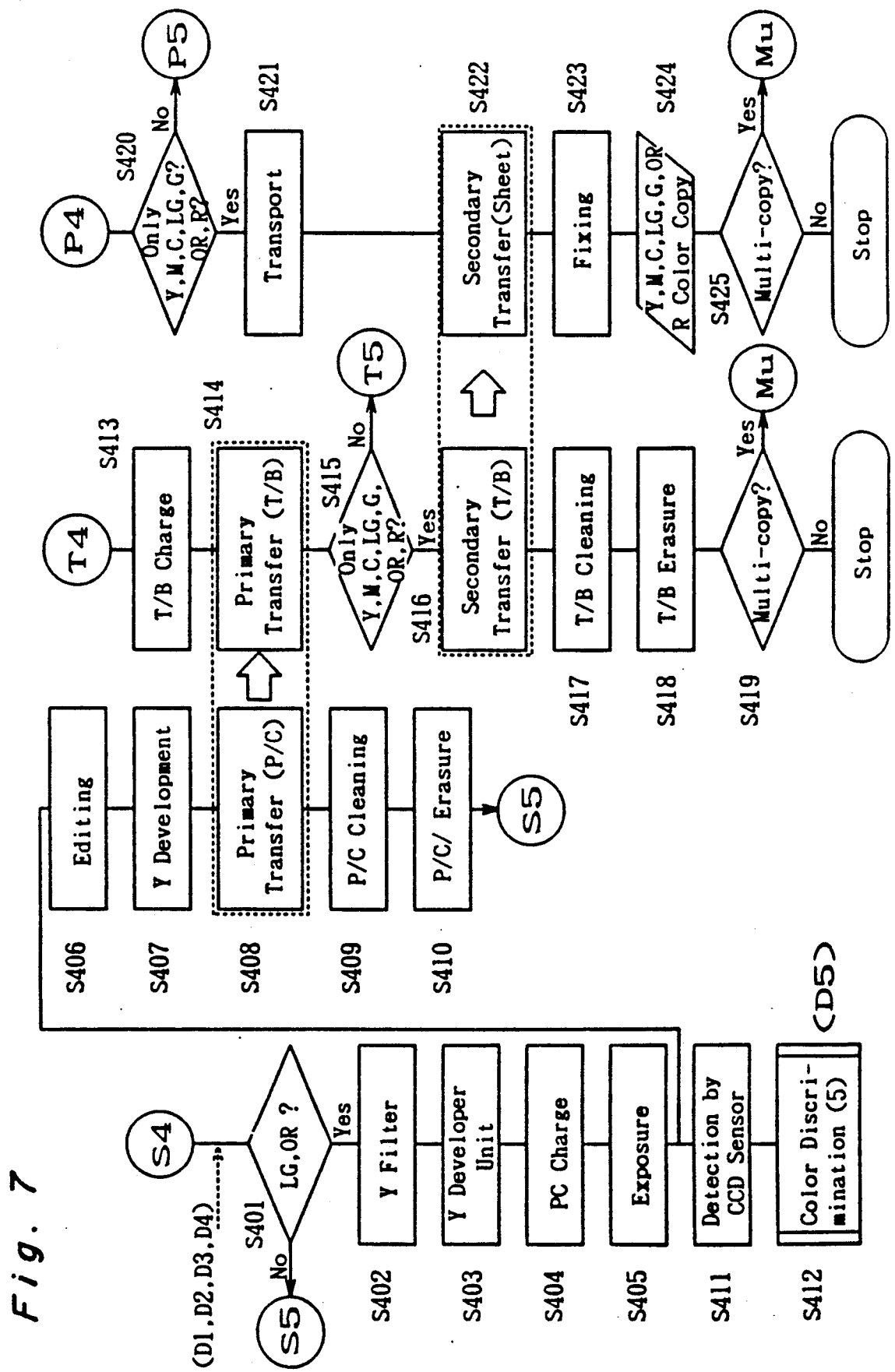

Referring now to FIG. 7, at step S401, on the basis of the discriminated color data resulting from the color discriminating process executed immediately therebefore, a decision is made to determine if images of the document contain any one of the light green (LG) and green (G). Should the result of the decision at step S401 indicate "Yes", the next succeeding step S402 is executed, but should it indicates "No", the program skips onto the fifth step S5.

Then at step S402, the yellow filter Fy is set in the path of travel of the reflected light rays. Around the photoreceptor drum 3, the yellow developer unit 7 of the developing device 6 is set in position ready to perform the development at step S403, followed by step S404 at which the outer peripheral surface of the photoreceptor drum 3 is electrostatically charged to a predetermined potential. Thereafter, and at step S405, the electrostatic latent images Iy, Ig, Ir, Ilg, Ior and Ibk on the photoreceptor drum 3.

Also, during the exposure the CCD sensor 30a detects the reflected rays of light at step S411 and, on the basis of the output from the CCD sensor 30a, a color discriminating process (5) is executed at step S412 to provide discriminated color data D5 of each area which is subsequently stored in a memory.

Thereafter, rays of light are radiated from the editing eraser 5 onto the photoreceptor drum 3 thereby to leave only the electrostatic latent images Ilg and Ior corresponding respectively to the light green (LG) and orange (OR) images, but to render the potentials of the other areas to be lowered down to about zero volt at step S406. Accordingly, during the subsequent developing operation, the yellow toner Ty is supplied only to the electrostatic latent images I(g and Ior at step S407 as shown in FIG. 14(a).

The yellow toner Ty so supplied onto the electrostatic latent images are primarily transferred at steps S408 and S414 onto the endless transfer belt 15.

In particular, at the time of the transfer onto the endless transfer belt 15, in the portions corresponding to the light green (LG) and orange OR) images, the yellow toner Ty is overlaid on the cyan toner Tc and the magenta toner Tm. However, the mount of transfer thereof is smaller than that of the magenta and cyan toners. (See FIG. 14(b)).

When and after the primary transfer completes in the manner as hereinabove described, the residue toner and the residue electrostatic charge remaining on the outer peripheral surface of the photoreceptor drum 3 are successively removed at steps S409 and S410, followed by the fifth step S5.

On the other hand, at both of the transfer device 11 and the sheet supply and transport system, on the basis of the discriminated color data D4, a decision is made to determine if the image of the document is colored only in yellow (Y), magenta (M), cyan (C), light green (LG), green (G), orange (OR) and red (R). If the result of decision indicates that the document contains colors other than yellow (Y), magenta (M), cyan (C), light green (LG), green (G), orange (OR) and red (R), the fifth steps T4 and P5 take place Steps S415 and S420).

Also, where the image in the document is colored only in yellow (Y) red (R), the toner images on the transfer belt 15 are subsequently secondarily transferred onto the copying sheet 100 at steps S416 and S422.

Then, in the transfer device 11, the residue toner and the residue electrostatic charge on the transfer belt 15 are removed successively, followed by Mu if the machine is in the multi-copy mode, or followed by the interruption of the operation if the machine is in the single copy mode (Steps S417 to S419). On the other hand, in the sheet supply and transport system, after the toner images referred to above have been transferred onto the copying sheet 100, the copying sheet 10 bearing the images formed with the use of yellow (Y), magenta (M), cyan (C), light green (LG), green (G), orange (OR) and red (R) toners is discharged onto the receiving tray 50 (Steps S423 to 425).

(v) Fifth Step: S5 (See FIG. 8)

The fourth step S5 is a process which takes place upon the termination of the fourth step S4 or which takes place when the result of decision at step S401 has indicated that none of the light green (LG) and the orange (OR) is contained in the document.

Figure 8:
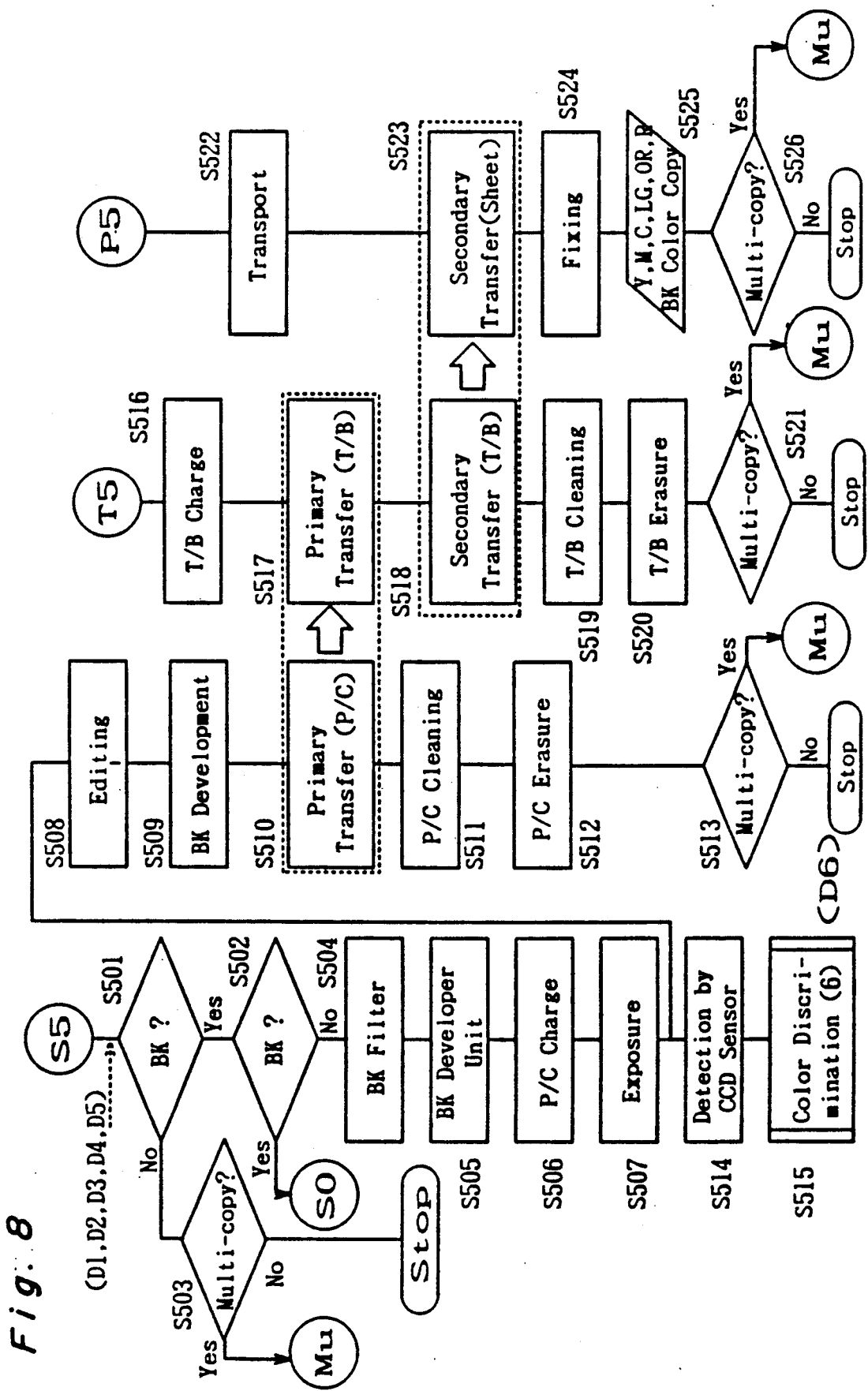
Figure 9:
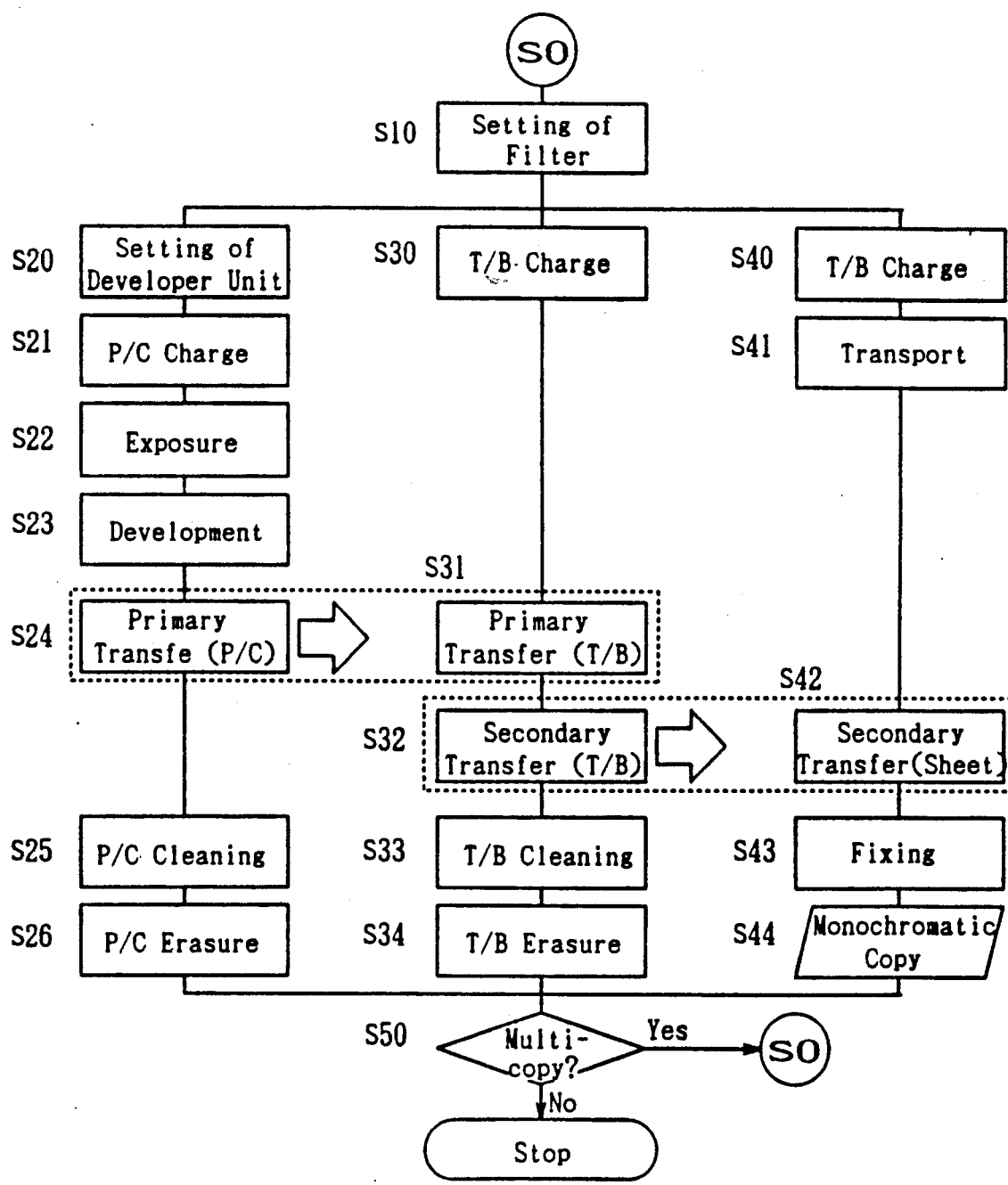

Referring now to FIG. 8, at step S501, on the basis of the discriminated color data calculated immediately therebefore, a decision is made to determine if images of the document contain the black (Bk). Should the result of the decision at step S501 indicate "Yes", the next succeeding step S502 is executed, but should it indicates "No", a decision step S503 takes place. If the result of decision at step S502 indicates that the image in the document is colored only in black (Bk), the monochromatic step SO takes place, but if it indicate that the image in the document is not only in black (Bk) the black filter Fbk set in the path of travel of the reflected light rays at step S504. On the other hand, if the result of decision at step S503 indicates that the machine is in the multi-copy mode, Mu takes place, but if it indicates that the machine is not in the multicopy mode, that is, the machine is in the single copy mode, the operation terminates.

Around the photoreceptor drum 3, the black developer unit Bk of the developing device 6 is set in position ready to perform the development at step S505, followed by step S506 at which the outer peripheral surface of the photoreceptor drum 3 is electrostatically charged to a predetermined potential. Thereafter, and at step S507, the electrostatic latent images Ibk are formed on the photoreceptor drum 3 (See FIG. 15(a)). In parallel therewith, the exposure the CCD sensor 30a detects the reflected rays of light at step S514, followed by the execution of a color discriminating process (6) at step S515 to calculate discriminated color data D6.

Thereafter, rays of light are radiated from the editing eraser 5 onto the photoreceptor drum 3 thereby to leave only the electrostatic latent images Ibk corresponding respectively to the black images, but to render the potentials of the other areas to be lowered down to about zero volt at step S508. Accordingly, during the subsequent developing operation, the black toner Tbk is supplied only to the electrostatic latent images Ibk at step S509 as shown in FIG. 15(a). The black toner Tbk so supplied onto the electrostatic latent images are primarily transferred at steps S510 and S517 onto the endless transfer belt 15 which has been electrostatically charged at step S516 See FIG. 15).

The toners transferred onto the endless transfer belt 15 throughout the first to fifth steps in the manner as hereinbefore fully described are all secondarily transferred onto the copying sheet 100 which has been supplied through the sheet supply and transport system, and the copying sheet 100 having the eight-color image so formed is subsequently discharged onto the receiving tray 50. If the machine is in the multi-copy mode, Mu takes place, but if the machine is in the single copy mode, the operation terminates. See steps S518 and S523 to S526).

It is to be noted that the residue toner and the residue electrostatic charge on the transfer belt 15 are removed successively in readiness for the next cycle, followed by Mu if the machine is in the multi-copy mode, or followed by the interruption of the operation if the machine is in the single copy mode (Steps S511 to S513 and S519 to S521).

After the foregoing process, in each area where a plurality of the toners of different colors have been transferred, the toner occupying the innermost position on the transfer belt 15 appears at the outermost position when transferred onto the copying sheet.

(vi) Monochromatic Step: SO (See FIG. 9)

This monochromatic step SO takes place when during the execution of any one of the first to fifth steps S1 to S5 the document has been determined as containing only the monochromatic image of one of yellow (Y), magenta (M), cyan (C) and black (BK) color.

During the execution of this monochromatic step SO, the filter corresponding to the color of the document image is selected and interposed in the path of travel of the reflected light rays at step S10. More specifically, where the document image is in yellow, magenta, cyan or black color, the yellow, magenta, cyan or black filter Fy, Fm, Fc or Bk is selected.

Then, around the photoreceptor drum, one of the developer units which contain the toner of a color identical with the color of the document image is set in position to apply the toner onto the photoreceptor drum which has been electrostatically charged to a predetermined potential, followed by the exposure through the optical system 27 to form the corresponding electrostatic latent image which is subsequently rendered to be a visible toner image of the predetermined color (See steps S20 to S23).

The toner image is thereafter primarily transferred onto the endless transfer belt which has been electrostatically charged (See steps S24, S30 and S31).

The toner which has been transferred onto the transfer belt 15 is secondarily transferred onto the copying sheet 100 which has been supplied from the sheet supply device 40, which sheet 100 is subsequently discharged onto the receiving tray 50 after having passed through the fixing device 49 (See steps S32 and S40 to S42.).

The residue toner and the residue electrostatic charge on the photoreceptor drum 3 and the transfer belt 15 are subsequently removed in readiness for the respective next succeeding cycle of operation, and, if the machine is set in the multi-copy mode, the monochromatic step SO is again executed (See steps S25, S26, S33, S34 and S50).

From the foregoing description of the present invention made in connection with the preferred embodiment thereof, it is clear that, by combining the yellow and cyan toners together, an image of light green or green color which is an intermediate color of them can be obtained, and by combining the yellow and magenta toners, an image of red or orange which is an intermediate color of them can also be obtained. In other words the use of the toners of three different colors is sufficient and effective to enable a reproduction of images of seven different colors.

Accordingly, the present invention makes it possible for the image forming machine to be provided with three developer units for accommodating yellow, cyan and magenta toners so that the images of seven different colors can be copied on the copying sheet. Therefore, the resultant image forming machine based on the present invention is very compact.

Also, since all of the toner images on the endless transfer belt are transferred onto the copying sheet at the same time, the image free from color deviation can be advantageously obtained.

Although the present invention has been fully described in connection with the preferred embodiment thereof with reference to the accompanying drawings, it is to be noted that various changes and modifications are apparent to those skilled in the art. By way of example, although in describing the preferred embodiment reference has been made to the image colored in eight different colors, the reproduction of the image in six different colors, for example, yellow (Y), magenta (M), cyan (C), green (G), red (R) and black (Bk), is possible if the second step shown in Table 2 is omitted.

Also, intermediate colors formed by mixing yellow (Y), magenta (M), cyan (C), green (G), red (R) and black (Bk) are not always limited to those described in connection with the preferred embodiment.

Accordingly, such changes and modifications are to be understood as included within the scope of the present invention as defined by the appended claims unless they depart therefrom.

What is claimed is:

1. An image forming method for forming a toner image on a recording medium from an original image, which comprises the steps of:
   reading color data from an original on a picture element to picture element basis with the use of an original image reading means;
   calculating magenta and cyan components on the basis of said color data read by said reading means to produce color discriminating data necessary to determine which toner to use;
   changing said color discriminating data so as to select either magenta or cyan colors without using both magenta and cyan toners in the event that said color discriminating data contains both magenta and cyan components; and
   forming said toner image on said recording medium based upon the changed color discriminating data.

2. The method as claimed in claim 1, wherein an electrostatic latent image forming means forms an electrostatic latent image on an electrostatic latent image carrier based upon the changed color discriminating data and developing said electrostatic latent image with a toner determined by said color discriminating data.

3. The method as claimed in claim 2, wherein said electrostatic latent image forming step includes a step of imparting an electrostatic charge uniformly over said electrostatic latent image carrier having a photoelectrically conductive layer, a step of projecting imagewise light of the original image onto said electrostatically charged electrostatic latent image carrier through a filter capable of passing therethrough rays of light of a color other than the color of toner determined by said color discriminating data determined during said calculating step, whereby said electrostatic latent image of a color corresponding to the color of toner determined by said color discriminating data determined, during said calculating step, can be formed on said electrostatic latent image carrier, and a step of exposing said electrostatic latent image, so formed, through an array of light emitting elements, said light emitting element being lit at a portion other than a portion corresponding to said color discriminating data changed during said changing step.

4. An image forming method for forming a toner image on a recording medium from an original image, which comprises the steps of:
   reading color data using an original image reading means;
   calculating magenta and cyan components on the basis of said color data ready by said reading means to produce color discriminating data necessary to determine which toner to use;
   changing said color discriminating data so as to select either a magenta or cyan color without using both magenta and cyan toners in the event that said color discriminating data contains both magenta and cyan components;
   forming an electrostatic latent image on an electrostatic latent image carrier by means of an electrostatic latent image forming means on the basis of said changed color discriminating data;
   developing said electrostatic latent image so formed with a toner determined by said color discriminating data to form a toner image on said electrostatic latent image carrier;
   transferring said toner image onto an intermediate transfer medium;
   said electrostatic latent image forming step, said developing step and said transfer step being sequentially repeated a predetermined number of times to form said toner image on said intermediate transfer medium; and
   transferring onto a recording medium all said toner images formed by yellow, magenta or cyan toner on said intermediate transfer medium.

5. A method for forming a color image by forming a yellow, magenta or cyan toner image on a recording medium based upon an original image, which comprises the steps of:
   reading color data using an original image reading means;
   calculating yellow, magenta and cyan components on the basis of said color data read by said reading means to produce color discriminating data necessary to determine which toner to use;
   changing said color discriminating data so as to select either magenta or cyan color without using both magenta and cyan toners in the event that said color discriminating data contains both magenta and cyan components;
   determining a sequence of use of a yellow toner according to said color data in the event it is determined that said color discriminating data contains yellow and magenta components or in the event it is determined that said color discriminating data contains yellow and cyan components; and
   forming said toner image on said recording medium by forming, according to said sequence of use, a yellow, magenta or cyan toner image based upon said changed color discriminating data.

6. The method as claimed in claim 5, wherein said toner image forming step includes a step for forming said toner image on an intermediate transfer medium by sequentially forming, according to a predetermined sequence of transfer, a yellow, magenta or cyan toner image based upon said changed color discriminating data and a step for transferring onto said recording medium all of said toner images so formed on said intermediate transfer medium.

* * * * *